Figure 1:
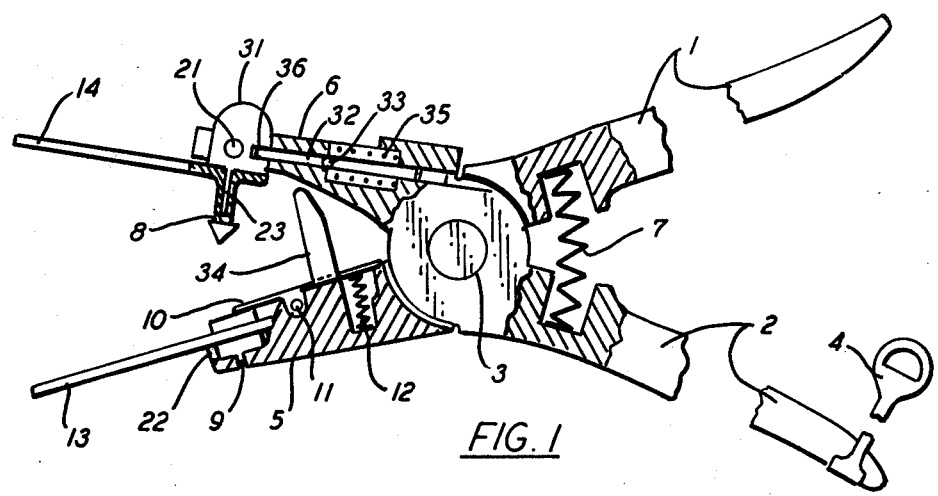

United States Patent [19]

Filmer

[11] 4,402,320
[45] Sep. 6, 1983

[54] ANIMAL EAR TAG APPLICATORS

[75] Inventor: David B. Filmer, Newport, Australia

[73] Assignee: Agri Plastics International Pty. Limited, Newport, Australia

[21] Appl. No.: 361,639

[22] Filed: Mar. 23, 1982

Related U.S. Application Data

[62] Division of Ser. No. 125,062, Feb. 27, 1980, Pat. No. 4,368,735.

[30] Foreign Application Priority Data

Mar. 9, 1979 [AU] Australia .............................. PD7978

[51] Int. Cl.³ .............................................. A01K 11/00
[52] U.S. Cl. .................................... 128/330; 227/144
[58] Field of Search ................. 128/330, 316; 40/300, 40/301; 227/144, 140

[56] References Cited

U.S. PATENT DOCUMENTS

| 4,120,303 | 10/1978 | Villa-Massone et al. | 128/330 |
| 4,185,635 | 1/1980 | Burford et al. | 128/330 |
| 4,201,214 | 5/1980 | Whiteley | 128/330 |

FOREIGN PATENT DOCUMENTS

| 464848 | 7/1974 | Australia | 128/330 |
| 746412 | 3/1956 | United Kingdom | 227/144 |

Primary Examiner—Michael H. Thaler
Attorney, Agent, or Firm—Ladas & Parry

[57] ABSTRACT

An applicator for an animal ear tag having a pliers-type action which has an ear-piercing pin member attached to the jaws, the pin member being capable of pivoting in a direction away from the jaws when closed.

5 Claims, 4 Drawing Figures

ANIMAL EAR TAG APPLICATORS

This is a division of application Ser. No. 125,062, filed on Feb. 27, 1980, now U.S. Pat. No. 4,368,735.

This invention is concerned with applicators for animal ear tags and is more particularly concerned to provide improvements in relation to a known such applicator.

The known applicator is the subject of Australian Letters Patent No. 464,848, the specification of which patent is incorporated herein by reference.

The said known applicator works effectively but is subject to a particular disadvantage in that when it is used to place an ear tag the operator must open the jaws of the device very quickly after placing the tag, otherwise the animal may suffer a tearing of its ear. This possibility arises since the first reaction of an animal when its ear is pierced by such an applicator is to rapidly withdraw its ear from the applicator and the pin member of the applicator is rigidly fixed to one jaw of the plier-like applicator.

It is an object of this invention to ameliorate the stated disadvantage of the said known applicator.

According to the present invention there is provided in an applicator for an animal ear tag, said applicator including first and second jaw members, first and second handles respectively extending from and being integral with said first and second jaw members with the handles and jaw members being pivotally interconnected to perform a pliers-type action, spring means biassing the handles away from each other, a pin member pivotally mounted on said first jaw member for movement between an engage position directed toward the second jaw member and a release position, a recess and aligned aperture in said second jaw member to receive said pin member in said engage position, a slidable bolt carried by said first jaw member for longitudinal sliding movement between a position in which said pin member is engaged thereby and locked and a position in which said pin member is released, a release rod mounted on the second jaw member and directed towards the first jaw member, said release rod being arranged to displace said bolt to said pin member release portion when the jaw members are closed and thereby permit pivotal movement of said pin to the release position, a plate pivotally mounted on the second jaw member, one end of said plate being slotted and said plate being spring biased to urge said slotted end toward the second jaw member to overlie the recess and aperture and provide a passage for said pin member.

Figure 2:
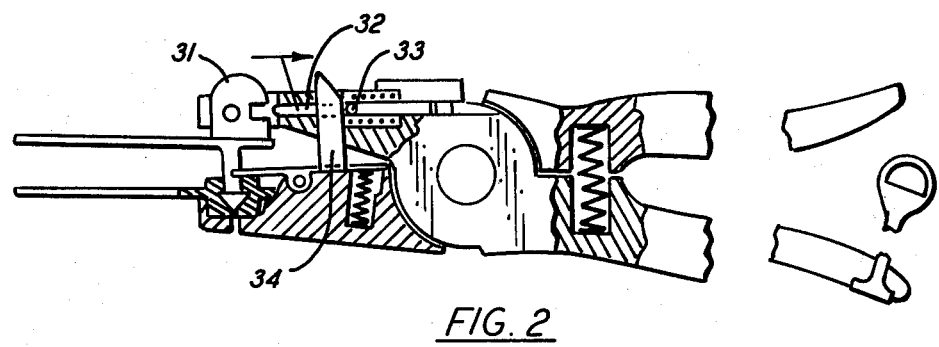
Figure 3:
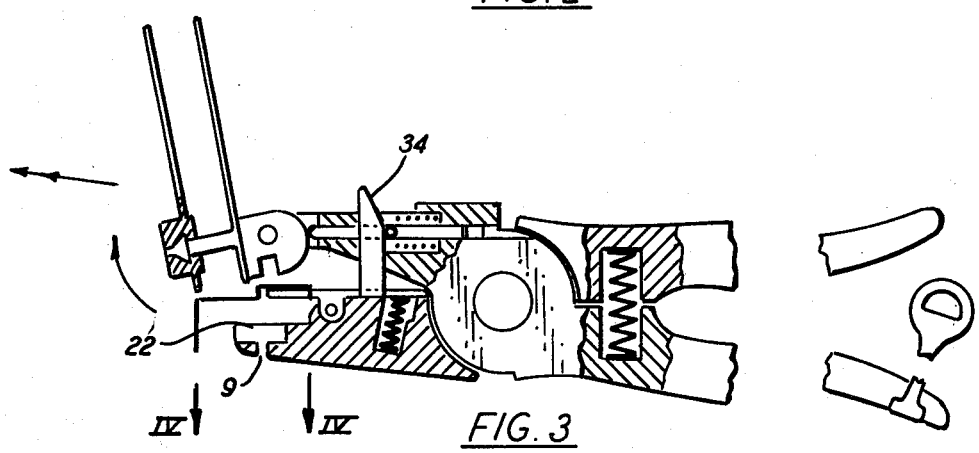
Figure 4:
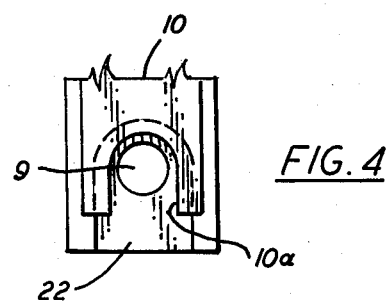

In order that the present invention may be more clearly understood and readily carried into effect, reference will be made to the accompanying drawing in which:

FIG. 1 is a sectional side view of an improved applicator according to this invention in its open position, FIG. 2 is a sectional side view of the applicator of FIG. 1 in its closed position before pivotting of the pin member, FIG. 3 is a similar view to that shown in FIG. 2, after the pin member has pivotted away from the closed jaws; and FIG. 4 is a section along the line IV—IV of FIG. 3.

Referring now to the drawing, the applicator comprises handles 1 and 2 biased away from each other by spring 7. A central pivot 3 of the device is disposed between handles 1 and 2 and jaws 5 and 6. Upper jaw 6 has a pin 23 depending therefrom adjacent the outer extremity of jaw 6. Pin 23 is pivoted at 21 to upper jaw 6.

Lower jaw 5 is provided with a recess 22 and its outer end and an aperture 9 extends from this recess 22 through jaw 5 such that pin 23 will enter aperture 9 when handles 1 and 2 are closed.

Pin 23, in an ear tagging operation, carries a male tag 14 which incorporates a spear member 8. A female tag 13 is disposed, in part, in recess 22 and before closure of handles 1 and 2, is held in position on lower jaw 5 by a slotted plate 10 which is pivoted at 11 to lower jaw 5. A spring 12 acts on plate 10 so as to effect retention of tag 13 in location on lower jaw 5. The slot 10a in plate 10 is such as to allow pin 23 and spear member 8 to readily enter aperture 9.

When a tagging operation is effected, lower jaw 5 with female tag 13 may be placed in position either behind or in front of an animal's ear whilst handles 1 and 2 are open. The handles are then closed so that spear member 8 pierces female tag 13 and tag 14 becomes fixed to the opposite side of the ear from tag 13, the shank of spear 8 being disposed through the ear.

The pivot 21 is provided with a curved cap 31 which incorporates a keyhole 36. When applicator handles 1 and 2 are open the pivot pin member is locked in position by a bolt oriented for longitudinal sliding movement to enter the keyhole 36. A compression spring 35 acts against the bolt 32 to ensure this locking engagement. The bolt 32 is provided with a lug 33 and a cooperating tapered pin 34 is fixed to lower jaw 5.

As handles 1 and 2 are closed the tapered pin 34 engages the lug 33 and forces the bolt 32 against spring 35 and out of engagement with the keyhole 36. This frees the cap 31 and attached pin 23 to pivot, as shown in FIG. 3, away from jaws 5 and 6 when the handles 1 and 2 are closed and a tagging operation is completed.

When the handles 1 and 2 are reopened, the tapered pin 34 disengages the bolt lug 33 and the compression spring 35 forces the bolt 32 into engagement with the curved surface of the cap 31. A new tag may then be located on pin 23 and the cap 31 rotated manually so that the bolt 32 engages keyhole 36 and the applicator resumes its position ready for a further tagging operation.

It will be appreciated that a tagged animal will pull its ear away from the applicator with the result that the engaged male 14 and female 13 tags will pivot away from the jaws 5 and 6 to the location already described and shown in FIG. 3.

During or at the end of this pivotal movement, the spear member 8 will become disengaged from pin 23. It will be appreciated that the pivotting of pin 23 relative to jaw 6 greatly lessens the prospect of tearing of the animal's ear which can result from slow opening of handles 1 and 2 after tagging has been effected. It will also be appreciated that a tagging operation may be completed without any further action of the operator. This confers on the apparatus of this invention a considerable advantage over prior art devices lacking in the pivotting capacity exhibited by the tag relative to the closed jaws of this device, after the ear is tagged. It is clear that this apparatus enables a tagging operation to be completed whilst the handles and jaws remain closed. In prior art devices considerable speed and skill are required of an operator in that as soon as a beast is tagged with the prior art device in the fully closed position, only a fraction of a second may elapse before the pliers must be reopened by the operator, since the instant reaction to tagging by a beast is to pull its ear away from the tagging implement.

I claim:

1. An applicator for an animal ear tag, said applicator including first and second jaw members, first and second handles respectively extending from and being integral with said first and second jaw members with the handles and jaw members being pivotally interconnected to perform a pliers-type action, spring means biassing the handles away from each other, a pin member pivotally mounted on said first jaw member for movement between an engage position directed toward the second jaw member and a release position, a recess and aligned aperture in said second jaw member to receive said pin member in said engage position, a slidable bolt carried by said first jaw member for longitudinal sliding movement between a position in which said pin member is engaged thereby and locked and a position in which said pin member is released, a release rod mounted on the second jaw member and directed towards the first jaw member, said release rod being arranged to displace said bolt to said pin member release position when the jaw members are closed and thereby permit pivotal movement of said pin to the release position, a plate pivotally mounted on the second jaw member, one end of said plate being slotted and said plate being spring biased to urge said slotted end toward the second jaw member to overlie the recess and aperture and provide a passage for said pin member.

2. An applicator according to claim 1, wherein said bolt is biased by spring means to normally retain said pin member.

3. An applicator according to claim 1, wherein said bolt is adapted to detachably engage said pin member by means of a cap extending from the pin member on the outer side of said first jaw, said cap having a keyhole portion therein adapted to receive said bolt.

4. An applicator according to claim 3, wherein said release rod extends substantially perpendicularly from the inner face of said second jaw and has a configuration such that, when the jaws close, the release rod contacts a lug extending from said bolt thereby to cause said bolt to disengage from said pin member to allow pivot actuation of said pin member.

5. An applicator according to claim 1, wherein said release rod extends substantially perpendicularly from the inner face of said second jaw and has a configuration such that, when the jaws close, the release rod contacts a lug extending from said bolt thereby to cause said bolt to disengage from said pin member to allow pivot actuation of said pin member.

* * * * *